United States Patent
Zhou et al.

(10) Patent No.: US 9,017,469 B2
(45) Date of Patent: Apr. 28, 2015

(54) SPINNING SOLUTION FOR INDUSTRIAL PRODUCTION OF PURE CHITOSAN FIBER AND THE METHOD FOR FABRICATING THE SAME

(75) Inventors: Jiacun Zhou, Taian (CN); Guangmin Hu, Taian (CN)

(73) Assignee: Shandong Huaxing Haici New Materials Co., Ltd, Tatan (CN)

( * ) Notice: Subject to any disclaimer, the term of this patent is extended or adjusted under 35 U.S.C. 154(b) by 378 days.

(21) Appl. No.: 13/696,079

(22) PCT Filed: Mar. 24, 2011

(86) PCT No.: PCT/CN2011/071942
§ 371 (c)(1),
(2), (4) Date: Feb. 19, 2013

(87) PCT Pub. No.: WO2011/140860
PCT Pub. Date: Nov. 17, 2011

(65) Prior Publication Data
US 2013/0145958 A1    Jun. 13, 2013

(30) Foreign Application Priority Data

May 10, 2010 (CN) .......................... 2010 1 0166861

(51) Int. Cl.
*C08L 5/08* (2006.01)
*D01D 1/02* (2006.01)
*D01F 9/00* (2006.01)

(52) U.S. Cl.
CPC ... *C08L 5/08* (2013.01); *D01D 1/02* (2013.01); *D01F 9/00* (2013.01)

(58) Field of Classification Search
CPC ............... D01D 1/02; D01F 9/00; C08L 5/08
See application file for complete search history.

(56) References Cited

FOREIGN PATENT DOCUMENTS

| | | |
|---|---|---|
| CN | 1129748 A | 8/1996 |
| CN | 1149093 A | 5/1997 |
| CN | 1470679 A | 1/2004 |
| CN | 1586635 A | 3/2005 |
| CN | 101812743 A | 8/2010 |
| JP | 60040224 A | 3/1985 |
| JP | 2005008795 A | 1/2005 |
| KR | 20080104932 A | 12/2008 |
| WO | WO2010031091 A1 | 3/2010 |

OTHER PUBLICATIONS

Tuzlakoglu et al, "Production and Characterization of Chitosan Fibers and . . . ", Macromol. Biosci (2004) pp. 811-819.*
Queen, "Electrospinning Chitosan-Based Nanofibers for Biomedical Applications", North Carolina State University, (2006).*
Struszczyk, "Chitin and Chitosan", Polymery (2002), 47, nr 6, pp. 396-403.*

* cited by examiner

*Primary Examiner* — David M Brunsman

(57) ABSTRACT

It is an object of the present invention to provide a spinning solution for industrial production of pure chitosan fiber and the method for fabricating the same. The method comprises the steps of: step (a): screening a flake chitosan raw material and removing impurities; step (b): putting in a dissolving kettle the screened flake chitosan raw material with a weight which is 3%-8% of the total weight of the spinning solution, sealing the dissolving kettle, and evacuating into vacuum; step (c): adding 0.9%-6% acetic acid solution, and soaking at the room temperature for 40-60 minutes; step (d): uniformly stirring at a rate of 26-60 rpm for 7.5-19 hours under a pressure of ≤5000 pa in the dissolving kettle, standing for 1-3 hours, and obtaining a spinning solution. By using this method, it is possible to not only maintain the original state structure of the molecular chain of chitosan, but also fast and uniformly dissolve flake chitosan and the spinning solution fabricated by this method in unit time, so as to meet the requirements in the industrial continuous production.

4 Claims, No Drawings

SPINNING SOLUTION FOR INDUSTRIAL PRODUCTION OF PURE CHITOSAN FIBER AND THE METHOD FOR FABRICATING THE SAME

CROSS-REFERENCE TO RELATED APPLICATION

This application is the U.S. national phase of International Application No. PCT/CN2011/071942, filed on 24 Mar. 2011, which claims the priority benefit of Chinese Patent application No. 201010166861.9, filed on May 10, 2010, the entire contents of which is hereby incorporated by reference.

BACKGROUND OF THE INVENTION

1. Field of the Invention

The present invention relates to a spinning solution for chitosan fiber and a method for fabricating the same, and more particularly to a spinning solution for industrial production of pure chitosan fiber and a method for fabricating the same.

2. Background of the Invention

The pure chitosan fiber is made from a raw material of high purity chitosan by wet spinning, is positively charged, has an excellent broad-spectrum antibacterial property, is biodegradable, has a function of promoting wound healing and hemostasis, and has advantages like excellent good hygroscopicity and air permeability. Therefore, it has great potential in applications such as medical products, dressing, antibacterial textile, and the like, and can create a significant social benefit.

Due to the process related reasons, the current spinning solution for producing chitosan fiber leads to a finished product with relatively low fiber dry breaking strength, relatively small dry breaking elongation, poor spinnability, and low functionality.

In the current patents about the production of chitosan fiber, there are various processes for fabricating chitosan spinning solution. In both production in a laboratory and industrial production in limited quantities, chitosan powder is formed into a chitosan fiber spinning solution. Up to now, flake chitosan has not been used to form chitosan fiber spinning solution. Nowadays, the high-performance pure chitosan fiber needed in the market requires that the flake chitosan with a high and ultra-high deacetylation degree and an ultra-high viscosity should be used as the raw material. The detailed description follows.

(I) 1. A higher deacetylation degree of chitosan facilitates the attachment and growth of cells on the chitosan film (fiber), a better compatibility with cells, and a less damage to cells. In contrast, the chitosan film (fiber) with a low deacetylation degree (<70%) has poor compatibility with cells, does not facilitate the attachment and growth of cells, and has a certain damage to cells. In this regard, reference can be made to "Effects of different deacetylation degrees on the compatibility between a chitosan film and corneal stroma cells", 2006; 23 (4): 800~804, JOURNAL OF BIOMEDICAL ENGINEERING.

2. As the deacetylation degree of chitosan increases, the chitosan has an improved antibacterial activity. In this regard, reference can be made to "Antibacterial activity of chitosan with different deacetylation degrees", Vol. 10, No. 4, JOURNAL OF SHANGHAI FISHERIES UNIVERSITY.

From the above two aspects, it can be found that a higher deacetylation degree of chitosan leads to the spun chitosan fiber has an improved functionality.

(II). The relationship between the viscosity and the molecular weight is indicated by the Mark-Houwink law:

$$[\eta]=kM\alpha,$$

where $\eta$ is the viscosity in mpa·s; K is a constant which is not so associated with the system properties, and has a temperature-dependent value; M is the relative molecular mass; and $\alpha$ is a value associated with the molecular weight. As can be seen, the decrease in the chitosan viscosity in fact results from the decrease of the molecular weight. It is well known that, for the chitosan with a larger molecular weight, the spun chitosan fiber has a higher dry breaking strength. From the view point of spinning a high-performance pure chitosan fiber, it is superior to use a flake chitosan raw material with the original chitosan molecular chain structure.

The current process for fabricating a spinning solution suffers from the following drawbacks.

Firstly, the current raw material for producing chitosan fiber has a medium deacetylation degree (75%<D·D<89%). As a result, the produced fiber has a low bacteriostasis rate, and has a poor compatibility with cells.

Secondly, the process, in which the flake chitosan is broken into powder and then the chitosan powder is formed into a chitosan fiber spinning solution, increases the procedure and cost. More importantly, this process destroys the molecular chain structure of chitosan. If the flake chitosan with a viscosity of 1000 mpa·s is ground into a powder of 1-2 mm, the viscosity may decrease to 700 mpa·s by about 30%. The resulting spinning solution has a reduced fiber forming property. In addition, the finished fiber has a relatively low dry breaking strength, a low dry breaking elongation, and a poor spinnability.

Thirdly, during fabricating a chitosan fiber spinning solution from flake chitosan, the dissolving rate in the prior art is too slow, and the product quality sometimes fluctuates. In theory, when the flake chitosan is decalcified and deproteinizated, a lot of space develops between tissues in the flake chitosan and may be filled with air. In addition, the flake chitosan raw material is formed by stacking 2 or more sheets, and there is also a lot of space among them. When the acetic acid solution contacts the flake chitosan, a viscous dissolved solution is formed on the surface of the flake chitosan raw material and wraps the surface of the flake raw material. As a result, the gas in the space of chitosan can not escape and the solution can not enter the space, which leads to a long time for dissolving the flake chitosan raw material. During industrial production, if a batch of flake chitosan raw material is put into a dissolving kettle, a phenomenon may be found in which some of the flake chitosan raw material has been dissolved, while the other has not been dissolved. Once all of the flake chitosan raw material has been dissolved, the chitosan solution which was dissolved early has partly hydrolyzed, and exhibits a decreased viscosity. Such a spinning solution tends to lead to broken ends during spinning, and is no longer able to spin a high performance fiber. Therefore, this approach cannot meet the requirements in the industrial continuous production, and always restricts the development of pure chitosan fiber in our country.

Therefore, there is an urgent need for solving the problem of fabricating high-performance pure chitosan spinning solution with a flake chitosan raw material in the industrial production.

BRIEF SUMMARY OF THE INVENTION

It is an object of the present invention to provide a spinning solution for industrial production of pure chitosan fiber and the method for fabricating the same, which not only can maintain the original state structure of the molecular chain of chitosan, but also can fast and uniformly dissolve flake chitosan and the spinning solution fabricated by this method in unit time, so as to meet the requirements in the industrial continuous production.

Based on the above theory and the object of the present invention, the following technical solution is adopted in the present invention:

a spinning solution for industrial production of pure chitosan fiber according to the present invention, characterized in that, the used chitosan raw material is flake, and has a deacetylation degree ≥92% and a viscosity ≥1000 mpa·s.

As a preferred solution for the spinning solution for industrial production of pure chitosan fiber, the used chitosan raw material has a deacetylation degree ≥95% and a viscosity ≥1500 mpa·s.

A method for fabricating spinning solution for industrial production of pure chitosan fiber according to the present invention, characterized in that, the method comprises the steps of:

step (a): screening a flake chitosan raw material and removing impurities;

step (b): putting in a dissolving kettle the screened flake chitosan raw material with a weight which is 3%-8% of the total weight of the spinning solution, sealing the dissolving kettle, and evacuating into vacuum;

step (c): adding 0.9%-6% acetic acid solution, and soaking at the room temperature for 40-60 minutes;

step (d): uniformly stirring at a rate of 26-60 rpm for 7.5-19 hours under a pressure of ≤5000 pa in the dissolving kettle, standing for 1-3 hours, and obtaining a spinning solution.

As a preferred solution for the method for fabricating spinning solution for industrial production of pure chitosan fiber, in said step (d), the pressure in the dissolving kettle is ≤3000 pa.

The present invention has the following technical effects.

Firstly, the raw flake chitosan powder is not broken into a powder, so that the procedure and cost is reduced, and the original molecular chain structure of the flake chitosan is maintained. Therefore, the viscosity and deacetylation degree of the chitosan is not altered, which increases the fiber forming property of the fabricated spinning solution, increases the dry breaking strength of the finished fiber, increases the dry breaking elongation, and increases the spinnability.

The spinning solution of the present invention is compared with the raw material of a chitosan powder, a flake chitosan (the prior art) in terms of the dry breaking elongation, the dry breaking strength, and the time for preparing a spinning solution for the fiber fabricated under the same process conditions. The comparison is listed in the following table.

| items | powder chitosan | flake chitosan (prior art) | flake chitosan (the present invention) | effects |
|---|---|---|---|---|
| time for preparing spinning solution (hr) | 10-48 | 24-48 | 9-23 | decrease by 1-25 with respect to the powder chitosan; decrease by 15-25 with respect to the flake chitosan (prior art); |
| dry breaking elongation (%) | 10 | — | 14 | increase by 40% |
| dry breaking strength (dtex/CN) | 1.4 | — | 1.8 | increase by 28.6% |

Secondly, since in step (b) of the present invention, the dissolving kettle into which the flake chitosan has been put is sealed and then vacuated into vacuum, the gas in the space formed when the flake chitosan is decalcified and deproteinizated, as well as the gas in the space formed during stacking flake chitosan raw material will be drawn out. In this manner, upon adding the acetic acid solution, the acetic acid solution contacts sufficiently and simultaneously with the flake chitosan raw material from inside and outside. As a result, the dissolving rate is increased, and only a small amount of bubbles form in the spinning solution, which reduces difficulty for defoaming the spinning solution in the following step. Uniformly stirring in step (d) also facilitates a homogeneous spinning solution viscosity, and further helps to produce a high quality pure chitosan fiber.

DETAILED DESCRIPTION OF THE EMBODIMENTS

The spinning solution for industrial production of pure chitosan fiber and the method for fabricating the same according to the present invention will be described in detail hereinafter.

First Embodiment screening a flake chitosan raw material with a viscosity 2600 mpa·s and a deacetylation degree 92%, removing impurities, and weighing 100 Kg;

putting in a dissolving kettle the weighed flake chitosan raw material, sealing the dissolving kettle, evacuating into vacuum, adding 0.9% acetic acid solution of 3180 Kg, and soaking at the room temperature for 60 minutes;

uniformly stirring at a rate of 26 rpm for 19 hours under a pressure of 5000 pa in the dissolving kettle, standing for 3 hours, and obtaining a spinning solution.

Second Embodiment screening a flake chitosan raw material with a viscosity 1400 mpa·s and a deacetylation degree 94%, removing impurities, and weighing 200 Kg;

putting in a dissolving kettle the weighed flake chitosan raw material, sealing the dissolving kettle, evacuating into vacuum, adding 3% acetic acid solution of 2960 Kg, and soaking at the room temperature for 50 minutes;

uniformly stirring at a rate of 40 rpm for 12 hours under a pressure of 3500 pa in the dissolving kettle, standing for 2 hours, and obtaining a spinning solution.

Third Embodiment screening a flake chitosan raw material with a viscosity 1000 mpa·s and a deacetylation degree 96%, removing impurities, and weighing 300 Kg;

putting in a dissolving kettle the weighed flake chitosan raw material, sealing the dissolving kettle, evacuating into vacuum, adding 6% acetic acid solution of 3450 Kg, and soaking at the room temperature for 40 minutes;

uniformly stirring at a rate of 60 rpm for 7.5 hours under a pressure of 2000 pa in the dissolving kettle, standing for 1 hour, and obtaining a spinning solution.

What is claimed is:

1. A method for fabricating spinning solution for industrial production of pure chitosan fiber, characterized in that, the method comprises the steps of:
    step (a): screening a flake chitosan raw material having a deacetylation degree of at least 92% and a viscosity at least 1000 mpa·s and removing impurities;
    step (b): putting in a dissolving kettle the screened flake chitosan raw material with a weight which is 3%-8% of the total weight of the spinning solution, sealing the dissolving kettle, and evacuating into vacuum;
    step (c): adding 0.9%-6% acetic acid solution, and soaking at the room temperature for 40-60 minutes;
    step (d): uniformly stirring at a rate of 26-60 rpm for 7.5-19 hours under a pressure of ≤5000 pa in the dissolving kettle, standing for 1-3 hours, and obtaining a spinning solution.

2. The method for fabricating spinning solution for industrial production of pure chitosan fiber according to claim 1, characterized in that, in said step (d), the pressure in the dissolving kettle is ≤3000 pa.

3. A method for fabricating spinning solution for industrial production of pure chitosan fiber, characterized in that, the method comprises the steps of:
    step (a): screening a flake chitosan raw material having a deacetylation degree of at least 95% and a viscosity at least 1500 mpa·s and removing impurities;
    step (b): putting in a dissolving kettle the screened flake chitosan raw material with a weight which is 3%-8% of the total weight of the spinning solution, sealing the dissolving kettle, and evacuating into vacuum;
    step (c): adding 0.9%-6% acetic acid solution, and soaking at the room temperature for 40-60 minutes;
    step (d): uniformly stirring at a rate of 26-60 rpm for 7.5-19 hours under a pressure of ≤5000 pa in the dissolving kettle, standing for 1-3 hours, and obtaining a spinning solution.

4. The method for fabricating spinning solution for industrial production of pure chitosan fiber according to claim 3, characterized in that, in said step (d), the pressure in the dissolving kettle is ≤3000 pa.

* * * * *